(12) United States Patent
Hayes et al.

(10) Patent No.: US 10,437,348 B2
(45) Date of Patent: Oct. 8, 2019

(54) USER INTERFACES FOR PATIENT CARE DEVICES

(71) Applicant: Stryker Corporation, Kalamazoo, MI (US)

(72) Inventors: Michael Joseph Hayes, Kalamazoo, MI (US); Krishna Sandeep Bhimavarapu, Portage, MI (US); Daniel Vincent Brosnan, Kalamazoo, MI (US); Anish Paul, Portage, MI (US); Aaron Douglas Furman, Kalamazoo, MI (US); Lavanya Vytla, Middletown, NJ (US); Brian Keith Carpenter, Kenosha, WI (US)

(73) Assignee: Stryker Corporation, Kalamazoo, MI (US)

( * ) Notice: Subject to any disclaimer, the term of this patent is extended or adjusted under 35 U.S.C. 154(b) by 175 days.

(21) Appl. No.: 15/162,653

(22) Filed: May 24, 2016

(65) Prior Publication Data
US 2016/0349854 A1 Dec. 1, 2016

Related U.S. Application Data

(60) Provisional application No. 62/166,354, filed on May 26, 2015.

(51) Int. Cl.
*G06F 3/045* (2006.01)
*G06F 3/044* (2006.01)
(Continued)

(52) U.S. Cl.
CPC .............. *G06F 3/021* (2013.01); *A61G 5/10* (2013.01); *A61G 7/05* (2013.01); *G06F 1/3215* (2013.01); *G06F 1/3262* (2013.01); *G06F 3/016* (2013.01); *G06F 3/044* (2013.01); *G06F 3/045* (2013.01); *G06F 3/0416* (2013.01);
(Continued)

(58) Field of Classification Search
None
See application file for complete search history.

(56) References Cited

U.S. PATENT DOCUMENTS

| 8,959,430 | B1 * | 2/2015 | Spivak ............... G06F 3/048 715/243 |
| 2008/0303797 | A1 * | 12/2008 | Grothe ............... G06F 3/016 345/173 |

(Continued)

*Primary Examiner* — Andre L Matthews
(74) *Attorney, Agent, or Firm* — Warner Norcross + Judd LLP

(57) ABSTRACT

A patient support apparatus, such as a bed, stretcher, cot, operating table, chair, or the like, includes a support surface for an occupant, a user interface, and a control system. The user interface includes multiple sensing layers to detect when a user touches the user interface. The control system activates only a first one of the sensing layers when the patient support apparatus is in a sleep mode, and upon the first sensing layer detecting a user touching the user interface while in the sleep mode, the control system activates that second sensing layer. One of the sensing layers may be resistive and the other capacitive. One of the layers may also detect a position at which the user touches the user interface, while the other layer may only detect that the user interface was touched, but not detect the position of the touch.

18 Claims, 11 Drawing Sheets

(51) Int. Cl.
*G06F 3/02* (2006.01)
*G06F 3/041* (2006.01)
*G06F 3/01* (2006.01)
*G06F 1/3234* (2019.01)
*G06F 1/3215* (2019.01)
*A61G 7/05* (2006.01)
*A61G 5/10* (2006.01)

(52) U.S. Cl.
CPC ...... *A61G 2200/00* (2013.01); *A61G 2203/10* (2013.01); *A61G 2203/16* (2013.01); *A61G 2203/20* (2013.01)

(56) References Cited

U.S. PATENT DOCUMENTS

| | | |
|---|---|---|
| 2014/0253500 A1 | 9/2014 | Curtis |
| 2014/0291950 A1 | 10/2014 | Hough et al. |
| 2014/0293145 A1* | 10/2014 | Jones .................... G06F 1/1626 349/12 |
| 2014/0354577 A1* | 12/2014 | Hanssen ................ G06F 3/044 345/174 |
| 2015/0077534 A1 | 3/2015 | Derenne et al. |
| 2015/0130762 A1* | 5/2015 | Wang .................... G06F 3/0416 345/174 |
| 2015/0135440 A1* | 5/2015 | Chiacchira ............. A61G 7/015 5/611 |
| 2016/0022039 A1 | 1/2016 | Paul et al. |

* cited by examiner

USER INTERFACES FOR PATIENT CARE DEVICES

CROSS-REFERENCE TO RELATED APPLICATIONS

This application claims priority to U.S. provisional patent application Ser. No. 62/166,354 filed May 26, 2015, by inventors Michael Hayes et al. and entitled USER INTERFACES FOR PATIENT CARE DEVICES, the complete disclosure of which is hereby incorporated herein by references.

BACKGROUND

The present disclosure relates to patient care devices, such as, but not limited to, beds, recliners, cots, stretchers, temperature management devices, etc., and more particularly to touch screens for controlling such devices.

Touch screen control panels often utilize capacitive technology for sensing where a user has pressed on a touch screen control panel. The use of capacitive sensing technology, however, is often undesirable in applications where liquids may be spilled or otherwise present on the touch screen control panel, or the user may be wearing gloves. Both of these situations are commonly present in medical settings (the presence of liquids and gloves).

SUMMARY

The present disclosure, in at least some embodiments, provides a touch screen control panel that has improved abilities for operating in environments where liquid may be present on the touch screen, and/or where one or more users may be wearing gloves while operating the touch screen. In other aspects, the present disclosure provides safety advantages for ensuring that control actions are not inadvertently taken due to liquids, or other contaminants, present on the surface of the touch screen. According to still other embodiments, power saving features are included for controlling the touch screen, including putting the screen to sleep and waking the screen up.

According to one embodiment, a patient care device is provided that includes an actuator, a control surface, an actuator button defined on the control surface, first and second sensing layers, and a control system. The control surface has a first area and the actuator button occupies a second area of the control surface that is less than the first area. The first sensing layer detects if a user touches the control surface in the first area. The second sensing layer detects if the user touches the control surface in the second area. The control system controls the actuator and is in communication with the first and second sensing layers. The control system actuates the actuator in a first manner if both the first sensing layer detects the user touching the control surface in the first area and the second sensing layer detects the user touching the control surface in the second area.

In other embodiments, the control system is adapted to not actuate the actuator in the first manner if either the first sensing layer does not detect the user touching the control surface in the first area or the second sensing layer does not detect the user touching the control surface in the second area. In at least one embodiment, the first sensing layer is a resistive sensing layer adapted to detect changes in electrical resistance when the user touches the control surface in the first area, and the second sensing layer is a capacitive sensing layer adapted to detect changes in electrical capacitance when the user touches the control surface in the second area.

In some embodiments, the second area is defined entirely within the first area.

The patient care device may further include a second actuator button defined on the control surface wherein the second actuator button occupies a third area separate from the second area and smaller than the first area. When so included, the control system actuates the actuator in a second manner different from the first manner if both the first sensing layer detects the user touching the control surface in the first area and the second sensing layer detects the user touching the control surface in the third area. Still further, the control system is adapted to not actuate the actuator in the second manner if either the first sensing layer does not detect the user touching the control surface in the first area or the second sensing layer does not detect the user touching the control surface in the third area.

An illumination layer is positioned adjacent one of the first and second sensing layers, in some embodiments. The illumination layer includes a light source adapted to provide backlighting to the actuator button. For some embodiments, the control system functions in multiple different modes, including a sleep mode and a wake mode. When in the wake mode, the control system activates the light source and both of the first and second sensing layers. When in the sleep mode, the control system activates only the first sensing layer, and deactivates both the light source and the second sensing layer. When in the sleep mode, the control system switches back to the wake mode and activates the light source and the second sensing layer upon detecting, via the first sensing layer, that the user has touched the control surface in the first area.

According to another embodiment, a patient care device is provided that includes an actuator, an actuator button, first and second sensing layers, and a control system. Both the first and second sensing layers detect if a user touches the actuator button. The control system operates in a wake mode and a sleep mode. The control system activates both the first and second sensing layers at all times while in the wake mode, and it activates only the first sensing layer while in the sleep mode. The control system actuates the actuator if the first and second sensing layers detect the user touching the button while the control system is in the wake mode, and the control system activates the second layer if the first sensing layer detects a user touching the button while in the sleep mode.

According to other aspects, the actuator button occupies a first area of a control surface and the control surface has a second area greater than the first area. The control system is adapted to deactivate the light source if the first sensing layer or the second sensing layer does not detect the user touching anywhere on the control surface for more than a threshold amount of time.

In some embodiments, the control system deactivates the second sensing layer when the control system deactivates the light source, and the control system activates the light source if the first sensing layer detects a user pressing anywhere on the control surface for more than a second threshold amount of time.

The patient care device may further include a non-actuator button occupying a third area on the control surface, wherein the third area is distinct from the first area and included within the second area. The non-actuator button controls a non-moving component of the patient care device. The control system controls the non-moving component of the patient care device if the second sensing layer detects the user touching the third area of the control surface, regardless of whether or not the first sensing layer detects the user touching the third area of the control surface.

According to another embodiment, a patient care device is provided that includes an actuator, a control surface, first and second buttons, a resistive sensing layer, a capacitive sensing layer, and a control system. The first button is defined in a first area of the control surface and is associated with a first function of the patient care device. The second button is defined in a second area of the control surface and is associated with a second function of the patient care device. The second area is different from the first area. Both the resistive and capacitive layers detect a users touch of the control surface. The control system communicates with the resistive and capacitive sensing layers and is adapted to determine the coordinates of the user's touch in a frame of reference using outputs from the capacitive sensing layer. The control system does not determine coordinates of the user's touch using outputs from the resistive sensing layer.

In other embodiments, the control system controls the first function only if the coordinates of the user's touch fall within the first area and the resistive sensing layer detects the users touch somewhere on the control surface. In some of those embodiments, the first function controls movement of a component of the patient care device and the second function controls a non-moving aspect of the patient care device. In such embodiments, the control system controls the second function if the coordinates of the user's touch fall within the second area, regardless of whether or not the resistive sensing layer detects the user's touch somewhere on the control surface.

According to another embodiment, a patient care device is provided that includes an actuator, a control surface, first and second buttons, first and second sensing layers, and a control system. The first button is defined in a first area of the control surface and is associated with a first function of the patient care device. The second button is defined in a second area of the control surface and is associated with a second function of the patient care device. The second area is different from the first area. The first sensing layer detects whether a user touches the first area or the second area of the control surface. The second sensing layer detects whether the user touches the control surface, but does not detect where on the control surface the user touches the control surface. The control system activates the first function only if the first sensing layer detects the user touching the first area and the second sensing layer detects the user touching the control surface. The control system also activates the second function only if the first sensing layer detects the user touching the second area and the second sensing layer detects the user touching the control surface.

In other embodiments, the first sensing layer includes a first capacitive sensor adapted to detect when the user touches the first area and a second capacitive sensor adapted to detect when the user touches the second area. The first capacitive sensor does not detect where within the first area the user touches the first area, and the second capacitive sensors does not detect where within the second area the user touches the second area.

The second sensing layer is a resistive sensing layer, in at least some embodiments. The resistive layer acts as an open circuit switch when the user is not touching anywhere on the control surface.

In still another embodiment, a patient care device is provided that includes an actuator, a control surface, first and second buttons, first and second sensing layers, a microcontroller, first circuitry, and second circuitry. The first button is defined in a first area of the control surface and is associated with a first function of the patient care device. The second button is defined in a second area of the control surface and is associated with a second function of the patient care device. The second area is different from the first area. The first sensing layer detects whether a user touches the first area or the second area of the control surface. The second sensing layer detects whether the user touches the control surface. The first circuitry is coupled to the first sensing layer and to the microcontroller and is adapted to provide a signal to the microcontroller indicative of whether the first area or the second area was touched by the user. The second circuitry is coupled to the second sensing layer and to the microcontroller and is adapted to provide a signal to the microcontroller indicative of whether the control surface was touched, but not indicative of a location on the control surface.

In other embodiments, the first sensing layer includes a first capacitive sensor adapted to detect when the user touches the first area and a second capacitive sensor adapted to detect when the user touches the second area. The second sensing layer may be a resistive layer that acts as an open circuit switch when the user is not touching anywhere on the control surface. The resistive layer consumes substantially no power when a user is not touching anywhere on the control surface.

According to other aspects, the first and second sensing layers are substantially planar, substantially translucent, and are positioned in contact with each other. The first sensing layer is also positioned further away from the user than the second sensing layer.

According to yet another embodiment, a patient support apparatus is provided that includes a base, a frame, a deck, an actuator, and a capacitive touch screen. The base includes a plurality of wheels, and the frame is supported by the base. The deck is supported by the frame and adapted to support a mattress thereon. The deck includes a plurality of sections and the actuator is adapted to move at least one of the sections of the deck. The capacitive touch screen controls the actuator and is adapted to distinguish between a user touching the capacitive touch screen and a liquid being in contact with the capacitive touch screen. The capacitive touch screen controls the actuator in response to the user touching the capacitive touch screen but does not control the actuator in response to the liquid being in contact with the capacitive touch screen.

In other aspects, the capacitive touch screen is further adapted to control the actuator in response to the user touching the capacitive touch screen while the user is wearing gloves.

In some embodiments, the capacitive touch screen measures both self-capacitance and mutual capacitance.

In still other embodiments, the capacitive touch screen includes capacitive sensors and conductors, wherein the capacitive sensors detect the user touching the capacitive touch screen, and wherein a voltage of the conductors is controlled to account for the presence of liquid being in contact with the capacitive touch screen.

In at least one embodiment, the patient care device is a recliner and the first function moves a component of the recliner in a first direction and the second function moves the component of the recliner in a second direction. In other embodiments, the patient care device is a patient support apparatus—such as a bed, stretcher, or cot—or a patient treatment device, such as a thermal management system for controlling the temperature of a patient.

Before the various embodiments disclosed herein are explained in detail, it is to be understood that the claims are not to be limited to the details of operation or to the details of construction, nor to the arrangement of the components set forth in the following description or illustrated in the drawings. The embodiments described herein are capable of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the claims to any specific order or number of components. Nor should the use of enumeration be construed as excluding from the scope of the claims any additional steps or components that might be combined with or into the enumerated steps or components.

DETAILED DESCRIPTION OF THE EMBODIMENTS

Figure 1:
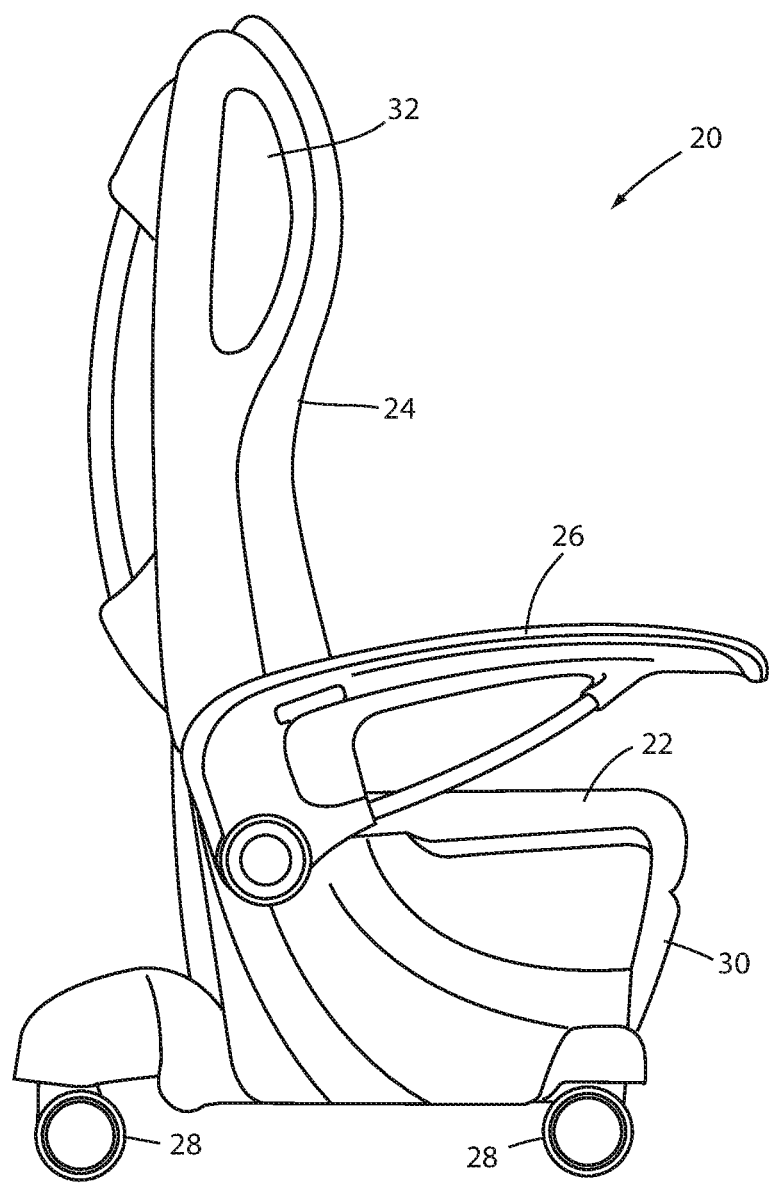
FIG. 1 is a side elevation view of a patient support apparatus embodying a touch screen control panel according to a first aspect of the disclosure.

A patient support apparatus 20 according to one embodiment of the present disclosure is shown in FIG. 1. Patient support apparatus 20, as shown in FIG. 1, is implemented as a recliner. It will be understood, however, that patient support apparatus 20 can be alternatively implemented as a bed, cot, stretcher, or other apparatus that is capable of supporting a person. Further, it will be understood that the embodiments of the present disclosure discussed herein can alternatively be incorporated into other types of patient care devices, such as, but not limited to, temperature management systems for controlling the temperature of patients. One such temperature management system is disclosed in commonly assigned U.S. patent application Ser. No. 14/282,383 filed May 20, 2014 by inventors Christopher J. Hopper et al. and entitled THERMAL CONTROL SYSTEM, the complete disclosure of which is hereby incorporated herein by reference.

Person support apparatus 20 of FIG. 1 includes a support surface or seat 22, a backrest 24, an armrest 26, a plurality of wheels 28, an adjustable leg rest 30, and two touch screen controls panels 32 (one positioned on either side of apparatus 20, with only one visible in FIG. 1). Seat 22 includes a support surface for supporting a patient thereon. Backrest 24 is angularly adjustable with respect to seat 22 about a pivot axis that extends perpendicularly out of the plane of the page of FIG. 1 so that a patient seated on seat 22 can change how far he or she leans back on patient support apparatus 20. Leg rest 30 is also movable from a stowed position (shown in FIG. 1) to an extended position that supports a patient's legs in a substantially horizontal orientation. The movement and physical construction of patient support apparatus 20 of FIG. 1 may take on any of the forms disclosed in commonly assigned U.S. patent application Ser. No. 14/212,253 filed Mar. 14, 2014 by inventors Christopher Hough et al. and entitled MEDICAL SUPPORT APPARATUS, the complete disclosure of which is incorporated herein by reference.

The control of the movement of patient support apparatus 20 is carried out via the touch screen control panels 32. One illustrative layout of control panel 32 is shown in more detail in FIG. 2. Touch screen control panel 32 includes a plurality of buttons 34 that, when pressed, implement one or more functions associated with patient support apparatus 20. More specifically, control panel 32 includes six position buttons 34*a-f*, two height buttons 34*g-h*, a settings button 34*i*, an exit alert toggle button 34*j*, and a patient lockout button 34*k*. The position buttons 34*a-f* change the orientation of seat 22, backrest 24, and leg rest 30 in the manner illustrated by the icons shown for each of these buttons in FIG. 2. Height buttons 34*g-h* control the vertical height of seat 22. Settings button 34*i*, when pressed, brings up a display of diagnostic and usage information on touch screen control panel 32. Exit alert toggle button 34*j*, when pressed, turns on and off an exit alert system incorporated into patient support apparatus 20 that, when turned on, issues an alert when a patient leaves patient support apparatus 20. Patient lockout button 34*k*, when pressed, disables a patient control panel (not shown) positioned on the inside of armrests 26 that otherwise allows a patient to control movement of patient support apparatus 20 while seated on seat 22.

A number of indicators 36 are also provided on touch screen control panel 32 that are selectively illuminated, depending upon the state of patient support apparatus 20 and/or the state of one or more buttons 34. Touch screen indicators 36, as will be discussed below, are not sensitive to being touched by a user. That is, touch screen control panel 32 is not configured to take any actions associated with indicators 36 when a user touches one of the indicators 36. Instead, a control system of patient support apparatus 20 is configured to selectively illuminate or not illuminate indicators 36, depending upon various factors discussed in more detail below.

Figure 2:
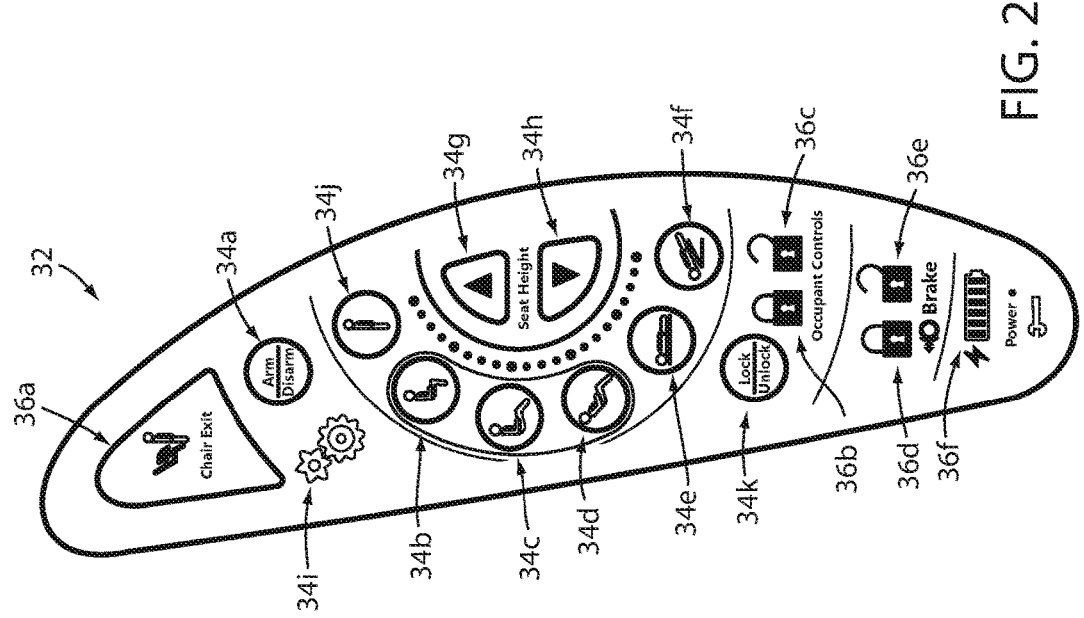
FIG. 2 is a plan view of the touch screen control panel of FIG. 1.

In the illustrative example of FIG. 2, touch screen control panel 32 includes an exit alert indicator 36*a*, an occupant controls locked indicator 36*b*, an occupant controls unlocked indicator 36c, a brake activated indicator 36d, a brake inactivated indicator 36e, and a battery status indicator 36f. Exit alert indicator 36a is illuminated when the exit detection system of patient support apparatus 20 is armed and detects a patient exiting from patient support apparatus 20. Occupant controls unlocked indicator 36b is illuminated when a user toggles the lock button 34k such that a patient is free to utilize the patient controls (not shown) positioned on the armrest 26. Occupant controls locked indicator 36c is illuminated when the user toggles the lock button 34k such that a patient is locked out from utilizing the patient controls positioned on armrest 26. Indicators 36d and 36e are illuminated when a brake is activated and deactivated, respectively. The brake stops the rotation and swiveling of wheels 28 when the brake is activated. The battery status indicator 36f is illuminated in a varying manner that provides an indication of the charge state of a battery onboard patient support apparatus 20.

Figure 3:
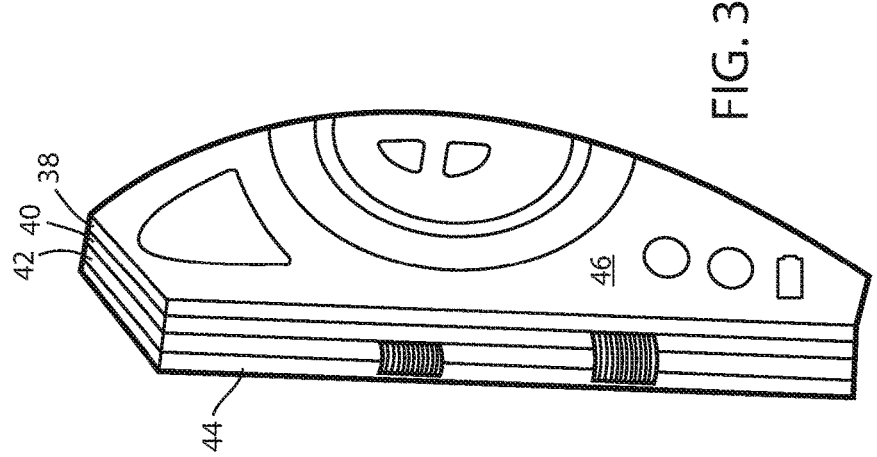
FIG. 3 is a partial perspective view of some of the internal components of the touch screen control panel of FIG. 2.

FIG. 3 illustrates in greater detail the physical construction of touch screen control panel 32. As shown therein, touch screen control panel 32 includes an overlay 38, a first sensing layer 40, a second sensing layer 42, and a circuit board layer 44. Overlay 38 includes an exterior control surface 46 that a user comes into physical contact with when touching touch screen control panel 32. Overlay 38 is constructed of glass, a conductive polymer, or other suitable material. In at least some embodiments, overlay 38 is made of a flexible material, such as polyethylene, or another type of flexible film. Circuit board layer 44 includes a circuit board 64 (FIG. 4) having a plurality of LEDs mounted thereon that, in combination, define an illumination layer, as will be discussed in greater detail below.

First sensing layer 40 is a resistive sensing layer that senses a users touch by detecting changes in electrical resistance. In at least one embodiment, resistive sensing layer 40 is constructed to include the following sublayers stacked on top of each other, starting from the bottom and moving upward: a bottom substrate with a conductive coating applied to its top surface (such as Indium Tin Oxide (ITO)), a sublayer of flexible insulated dots spaced apart from each other, and a flexible top sublayer having a conductive coating (e.g. ITO) applied to its bottom surface. In this embodiment, the lower ITO sublayer has one electrode coupled to it and the upper ITO sublayer has another electrode coupled to it. When a user presses on the control surface 46, the pressure will cause the flexible top sublayer to flex into partial contact with the bottom substrate, thereby causing the upper ITO sublayer to make physical contact with a portion of the lower ITO sublayer. A voltage applied across the electrodes of the top ITO sublayer and the bottom ITO sublayer will therefore change. This construction of first sensing layer 40 does not detect a coordinate location of where a user presses on first sensing layer 40. Instead, first sensing layer 40 is adapted to provide a change in voltage whenever a user presses anywhere on it, and its outputs do not provide an indication of the coordinate location of where the user has pressed.

Substantially no current flows between the conductive sublayers (upper and lower ITO sublayers) of the first sensing layer 40 (because of the insulated dots) when a user is not pressing against first sensing layer 40. However, when a user presses against first sensing layer 40, the insulated dot sublayer is compressed sufficiently that the conductive sublayers make physical contact, thereby allowing current to flow and the applied voltage to change. As will be discussed below, the control circuitry coupled to this embodiment of first sensing layer 40 looks for either a change in current or a change in voltage between the applied voltage lead and the ground lead. Such a change is indicative a user pressing on first sensing layer, although, as noted, the change does not indicate where on the surface the press took place.

Second sensing layer 42 is, in at least one embodiment, a capacitive sensing layer 42 that detects a user's touch by detecting changes in electrical capacitance. In at least one embodiment, capacitive sensing layer 42 is implemented to include a plurality of capacitive buttons that underlie each button 34. Each capacitive button includes a capacitive pad 48 (FIG. 4) that is defined in second sensing layer 42 at a location that aligns with one of the buttons 34. In this manner, each pad 48 is able to detect when a user presses on control surface 46 at a location corresponding to each button 34. More specifically, in at least one embodiment, capacitive sensing layer 42 includes a substrate sublayer on which are mounted a plurality of capacitive pads 48 (FIG. 4) that are aligned with the buttons 34. An electrical ground 50 surrounds the perimeter of each capacitive pad, but is spaced apart from each pad. Applying a voltage to the capacitive pads 48 creates capacitance between the pads 48 and the nearby ground 50.

Figure 4:
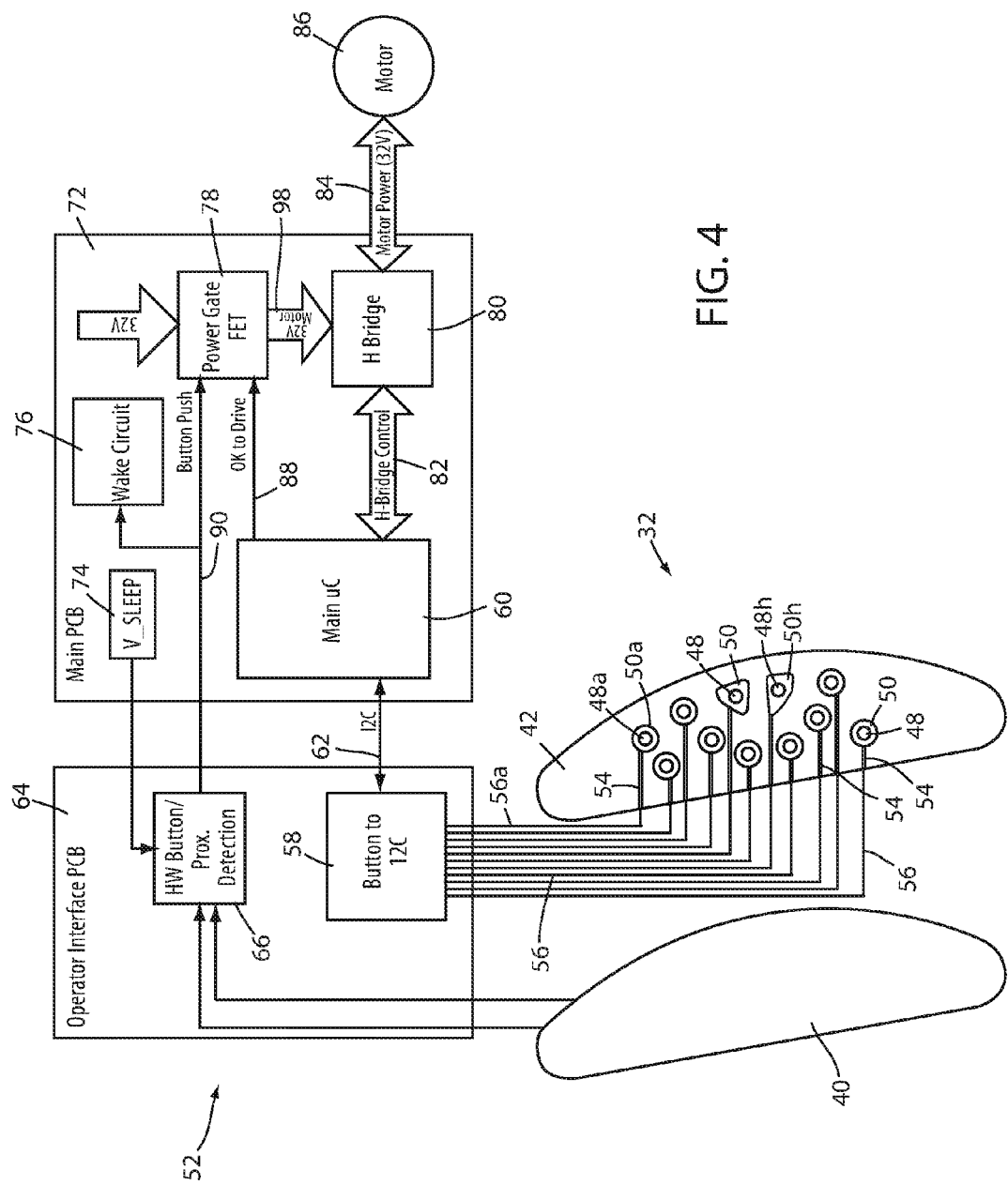
FIG. 4 is a block diagram of the electrical components of a control system incorporating the touch screen control panel of FIG. 2.

When a user touches an area of overlay 38 that is aligned with one of the buttons 34 (and thus also aligned with one of the capacitive pads 48), the user's finger changes the capacitance between the pad 48 adjacent the users touch and the surrounding ground 50. This change in capacitance is sensed by a control system 52 (FIG. 4). Control system 52 then takes appropriate action corresponding to the function controlled by the button 34, as will be explained in greater detail below.

Each capacitive pad 48 and ground 50 is electrically coupled to a corresponding electrical trace within capacitive sensing layer 42 (FIG. 4). Traces 54, in turn, are coupled to wires 56 that electrically couple each trace 54 to a first circuit 58. First circuit 58 digitizes and converts the incoming analog voltages on parallel wires 56 to a serial stream of bits that is fed into a controller 60, which is a microcontroller in at least one embodiment. In the embodiment shown in FIG. 4, first circuit 58 transmits this serial data to controller 60 over a data line 62 according to the conventional I²C serial protocol. It will be understood that other types of communication protocols can be used.

Each capacitive pad 48 and associated ground 50 includes its own separate electrical connection to $1^{st}$ circuit 58 (via its associated traces 54 and wires 56). This enables each capacitive pad 48 to individually sense whether or not a user has touched control surface 46 in an area corresponding to one of buttons 34. More specifically, as shown in FIG. 4, capacitive pad 48a and ground 50a correspond to button 34a (FIG. 2). Thus, when a user touches the area of control surface 46 corresponding to button 34a, the capacitance between capacitive pad 48a and ground 50a will change, and this will be sensed by control system 52. The touching of control surface 46 in the area of button 34a, however, will not change the capacitance between any of the other buttons 34 and their corresponding pads 48 and grounds 50 (or, more precisely, will not change the capacitance sufficiently to register as a button push). Control system 52 therefore knows when button 34a is pressed due to the voltage change on wire 56a (which connects to capacitive pad 48a. As a result, control system 52 will control one or more aspects of patient support apparatus 20 in a manner that corresponds to the function associated with button 34a.

Capacitive sensing layer 42 of FIG. 4 does not determine any X,Y location of the user's button press within the areas defined by each button 34. That is, control system 52 receives a signal on wire 56*a* when a user presses on button 34*a*, but the signal does not indicate where within the area occupied by button 34*a* on control surface 46 the user touched. Nor does control system 52 have any use for such information. Instead, capacitive sensing layer 42, in the embodiment of FIG. 4, only provides signals indicating when any one or more of the buttons 34 are pressed by a user, and does not provide further information about the location of the users touch within the individual button areas.

Because each button 34 includes its own individual capacitive button or sensor (comprised of pad 48 and ground 50), capacitive sensing layer 42 is capable of sensing when a user presses simultaneously on more than one button 34. That is, if a user presses on, say, buttons 34*a* and 34*h* at the same time, capacitive pad 48*a* and capacitive pad 48*h* will simultaneously detect this. Further, leads 56*a* and 56*h* will simultaneously send signals to first circuit 58 indicating that buttons 34*a* and 34*h* have both been pressed. Main controller 60 will determine whether or not the functions corresponding to the simultaneously pressed buttons can be carried out simultaneously or not (e.g. pressing buttons 34*g* and 34*h* cannot be carried out simultaneously as they move the height of seat 22 in opposite directions).

In the embodiment shown in FIG. 4, capacitive sensing layer 42 does not detect when a user presses on control surface 46 in an area outside of one of the buttons 34 (and thus outside of one of the areas of pads 48). In contrast, resistive sensing layer 40 detects when a user presses anywhere on control surface 46, regardless of whether or not the pressing is aligned with one of the areas of control surface 46 that correspond to one of the buttons 34. As noted, however, the signal provided by resistive sensing layer 40 indicates that a user has touched somewhere on control surface 46, but the signal provides no indication of where on control surface 46 the touch occurred.

The operation of the embodiment of control system 52 depicted in FIG. 4 will now be described in more detail. Control system 52 includes a control panel printed circuit board (PCB) 64 that is part of circuit board layer 44. PCB 64 includes first circuit 58 for processing the outputs of capacitive sensing layer 42 and a second circuit 66 for processing the outputs of resistive sensing layer 40. In at least one embodiment, first and second circuits 58 and 66 are attached to a side of PCB 64 that is opposite capacitive sensing layer 42. Further, in at least one embodiment, PCB 64 includes a plurality of light emitting diodes (LEDs) (not shown) attached to the side of PCB 64 that faces capacitive sensing layer 42. These LEDs are positioned at locations that align with buttons 34 and indicators 36, as well as other locations where backlighting is desired on touch screen control panel 32. The activation and deactivation of these LEDs is controlled by controller 60 based upon the state of patient support apparatus 20 and other factors, some of which will be described in greater detail below. The combination of these LEDs and PCB 64 define an illumination layer that selectively provides back illumination to varying portions of control surface 46, as will also be discussed in greater detail below.

Second circuit 66 includes a first connection 68 and a second connection 70 to a main PCB 72. Main PCB 72 is physically located on patient support apparatus 20 at a location different from the location of touch screen control panels 32, such as within a lower region of backrest 24, or elsewhere. Main PCB 72 contains main controller 60, previously mentioned, as well as other circuitry. Although not shown in FIG. 4, main PCB 72 includes connections to a second PCB 64 that is positioned on an opposite side of backrest 24. As mentioned previously, patient support apparatus 20 of FIG. 1 includes two touch screen control panels 32, one of which is positioned on a first side of backrest 24 and the other of which is positioned on the opposite side of backrest 24. Each of these touch screen control panels 32 includes its own PCB 64, and each of these PCBs 64 feed into main PCB 72. Thus, there is only a single PCB 72 in the patient support apparatus embodiment of FIG. 1 that communicates with both of PCBs 64. The communication between PCB 72 and each PCB 64, however, is the same for both PCBs 64. Therefore, it will be understood that the description below of the operation of PCB 72 and its communication with the single PCB 64 shown in FIG. 4 is applicable to the other PCB 64, and that the control system 52, when implemented on patient support apparatus 20 of FIG. 1, includes a second PCB 64 that operates in the same manner as the one described herein with respect to FIG. 4.

Figure 5:
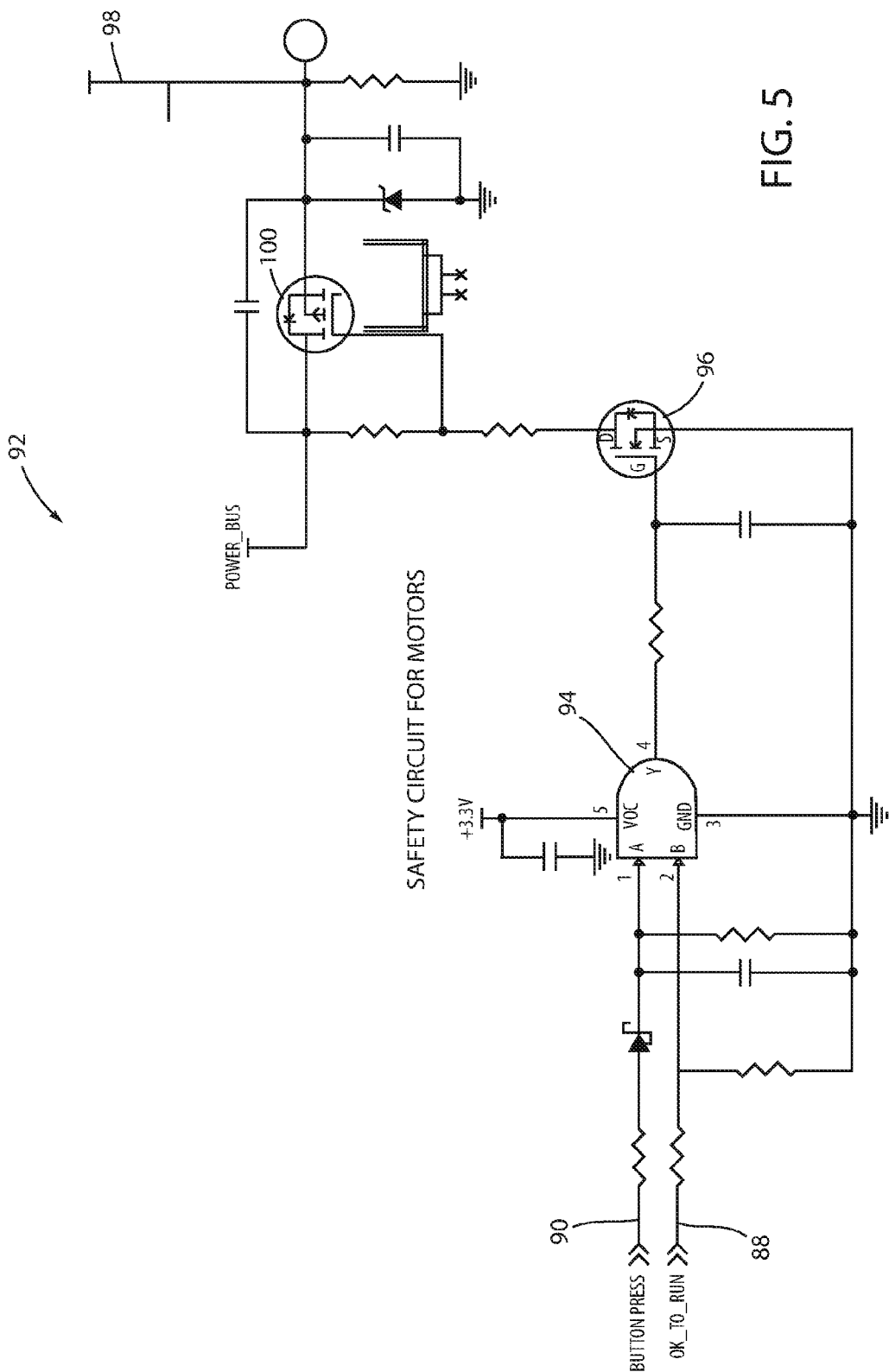
FIG. 5 is a circuit diagram of a safety circuit used in the control system of FIG. 4.

Main PCB 64 includes a sleep circuit 74, a wake circuit 76, a power gate FET circuit 78, an H-bridge 80, an H-bridge control connection 82 between microcontroller 60 and H-bridge 80, and a motor power line 84 that couples H-bridge 80 to one or more motors 86. Power gate FET circuit 78 selectively delivers electrical power to H-bridge 80 by selectively supplying H-bridge 80 with a motor voltage 98. Power gate FET circuit 78 receives two control inputs that it uses to determine whether motor voltage 98 is delivered to H-bridge 80 or not. A first input 88 comes from microcontroller 60 and a second input 90 comes from second circuit 66. Power gate FET circuit 78 includes within it a safety circuit 92 that is illustrated in more detail in FIG. 5 and that receives the signals from first and second inputs 88 and 90, respectively. Safety circuit 92 feeds the inputs 88 and 90 into an AND gate 94 that performs a logical AND operation on the two inputs. AND gate 94 outputs a logical high signal when both inputs 88 and 90 are logically high. The output from AND gate 94 activates a first Metal Oxide Semiconductor Field Effect Transistor (MOSFET) 96. The activation of MOSFET 96, in turn, activates a second MOSFET 100. First MOSFET 96 acts as a lower power switch and second MOSFET 100 acts as a high power switch for supplying power to H-bridge 80. That is, when both MOSFETs 96 and 100 are activated, power sufficient to run motor 86 is supplied to H-bridge 80. When MOSFETs 96 and 100 are not activated, H-bridge 80 does not receive enough power to run motor 86.

The chart below illustrates the result of the logic carried out by safety circuit 92 based upon the inputs 88 and 90. If first sensing layer 40, which is a resistive layer, detects that a user has touched control surface 46, second control circuit 66 will output a logical 1 on second input 90. If first sensing layer 40 does not detect that a user has touched control surface 46, second control circuit 66 will output a logical 0 on second input 90. If second sensing layer 42 detects that a user has pushed one of the buttons 34, first circuit 58 will identify which button was pushed to controller 60 via data line 62. Microcontroller 60, in turn, will output a logical 1 on first input 88. If second sensing layer 42 does not detect that a user has pushed one of the buttons 34, first circuit 58 will not provide an indication of a button push to microcontroller 60, and microcontroller 60, in turn, will output a logical 0 on first input 88.

| Capacitive Button Press on 2nd Layer 42 | Resistive Press on Layer 40 | Power Gate FET Circuit 78 State | Motion |
|---|---|---|---|
| 0 | 0 | OFF | No |
| 0 | 1 | OFF - Fault | No |
| 1 | 0 | OFF - Fault | No |
| 1 | 1 | ON | Yes |

As a result of the foregoing, power gate FET circuit 78 will receive two logical high or 1 values on first and second inputs 88 and 90 only if both first sensing layer 40 detects a user pushing anywhere on control surface 46 and second sensing layer 42 detects a user pushing on one or more of the areas of control surface 46 that correspond to one of the buttons 34. Only in this case will power gate FET circuit 78 supply power to H-bridge 80, and only when power is supplied to H-bridge 80 will motor 86 be able to run. Thus, safety circuit 92 ensures that motor 86 of patient support apparatus 20 only operates when two different sensing layers have detected a user's pressing on control surface 46. This helps ensure the safety of patient support apparatus 20.

For example, if liquid is spilled on one of the touch screen control panels 32, this may change the capacitance at one or more of the capacitive pads 48 sufficiently to be detected by second sensing layer 42 and interpreted by first circuit 58 as a user pressing on one or more buttons 34. However, such spilled liquid will not change the electrical resistance measured by first sensing layer 40, and first sensing layer 40 will therefore not provide an indication that a user has touched control surface 46. As a result, first input 88 to circuit 78 will be a logical 1, while second input 90 to circuit 78 will be a logical 0, thereby preventing motor 86 from running. Spilled liquids will therefore not trigger any motion of patient support apparatus 20.

As was mentioned previously, first sensing layer 40 will provide a signal indicating that a user has touched control surface 46, but the signal will not provide a location of where the user has touched control surface 46. Because of this, it is not possible—nor is there any need—for microcontroller 60, or any of the other circuitry of control system 52, to compare the locations of the touch as detected by second sensing layer 42 with the location of the touch as sensed by sensing layer 40. Instead microcontroller 60 controls motor 86 based upon the users touch, as detected by second sensing layer 42, so long as pressing of buttons 34 is accompanied by a detection signal from first sensing layer 40.

Resistive sensing layer 40, as noted above, is constructed to include two conductive sublayers that are separated by a plurality of spacers. When the top sublayer is pressed by a user into the lower sublayer, the spatial separation between these two sublayers is extinguished at the point of the user's contact, thereby allowing current to flow through between the layers. As a result of this construction, when no one is touching control surface 46, first sensing layer 40 acts essentially as an open switch between the upper and lower conductive sublayers. Further, because resistive layer 40 does not perform any scanning of conductive lines, or otherwise use any power to determine a specific location that a user touches on control surface 46, resistive layer 40 consumes substantially no current when no user is touching control surface 46.

The substantial lack of current draw by resistive layer 40 when no one is touching control surface 46 is utilized, in at least one embodiment of patient support apparatus 20, as a power efficient manner for waking up patient support apparatus 20 after it has gone into a sleep mode. When patient support apparatus 20 is operating on battery power (as opposed to being coupled to an AC power outlet), and the battery charge level drops below a certain level, patient support apparatus 20 is adapted to enter the sleep mode. In the sleep mode, electrical power to controller 60 and second sensing layer 42 is shut off. Further, electrical power to the LEDs on PCB 64 is also shut off. As a result, when patient support apparatus 20 is in the sleep mode, the backlighting applied to touch screen control panel 32 is terminated, and control surface 46 appears as a black area to users. Electrical power, however, is not terminated to first sensing layer 40. This enables first sensing layer 40 to detect when a user presses anywhere on control surface 46, which acts as a trigger for waking control system 52 out of the sleep mode and back into a wake mode.

In at least one embodiment, control system 52 is configured to operate in four different modes: a wake mode, a dark mode, a sleep mode, and an off mode. The chart below illustrates the state of various components of patient support apparatus 20 in each of these different modes.

| MODE | Resistive Layer 40 | Capacitive Layer 42 | Microcontroller 60 | Wake circuit 76 | V_Sleep Circuit 74 | LEDs of board 64 (illumination layer) |
|---|---|---|---|---|---|---|
| Wake | active | active | active | active | active | active |
| Dark | active | active | active | active | active | inactive |
| Sleep | active | inactive | inactive | active | active | inactive |
| Off | inactive | inactive | inactive | inactive | inactive | inactive |

Control system 52 switches between these four modes depending upon both the state of a battery that may be supplied to patient support apparatus 20 (when no AC power cord is plugged into an AC outlet) and the state of user activity with respect to one or more of the control panels 32. When patient support apparatus 20 is operating on battery power, it will remain in the wake mode as long as the battery charge level is above a charge threshold and a user is currently, or has recently, pressed against one of the touch screen control panels 32. In other words, when the battery is above the charge threshold, control system 52 will remain in the wake mode for a threshold amount of time after a person presses on one of control panels 32, and will reset an internal timer that measures that threshold amount of time whenever a user presses on one of control panels 32. As a result, control system 52 will only switch to the dark mode when the threshold amount of time has passed without a user pressing on one of control panels 32. As can be seen in the chart above, control system 52 will turn off the LEDs on circuit board 64 when in the dark mode, but will continue to supply power to all of the other components shown in the above chart. In one embodiment, this threshold amount of time is set to be approximately five minutes. In other embodiments, this threshold amount of time is varied to other lengths of time.

When control system 52 is operating in the dark mode, it will remain in the dark mode until either of two events occurs. First, control system 52 will switch back to the wake mode from the dark mode whenever either first or second sensing layers (or both) 40 and 42 detect a user pressing on control surface 46. Second, control system 52 will switch from the dark mode to the sleep mode if the charge level of the battery drops below the charge threshold mentioned above. When in the sleep mode, control system 52 stops supplying power to the capacitive sensing layer 42 and microcontroller 60 (the LEDs remain unpowered as well). This helps conserve battery power. The V_Sleep circuit 74, however, continues to supply electrical power to first sensing layer 40. In one embodiment, V_Sleep circuit 74 provides approximately 3.3 volts to first sensing layer 40. Other voltages, of course, can be supplied depending upon the physical construction of sensing layer 40.

V_Sleep circuit 74 also supplies electrical power to wake circuit 76 while control system 52 is in the sleep mode. Wake circuit 74 is designed to detect when a user touches control surface 46 based upon the outputs from first sensing layer 40. As was discussed above, in at least one embodiment, first sensing layer 40 only includes two wires or leads: a power supply lead (V_Sleep) and ground. Second circuit 66 monitors one or both of these leads and, when it detects a user has compressed the conductive sublayers of resistive sensing layer 40 together, it sends a signal to wake circuit 76 which in turn switches control system 52 back to the wake mode. That is, wake circuit 76 starts supplying power to capacitive sensing layer 42 and microcontroller 60 again, and microcontroller 60, in turn, starts supplying power to one or more of the LEDs on circuit board 64.

Control system 52 switches to the off mode when the charge state of the battery drops below a second threshold that is lower than the charge threshold (discussed above) used to trigger the switch from the dark (or wake) mode to the sleep mode. That is, control system 52 switches to the sleep mode when the battery has discharged to a first threshold level, and switches to the off mode when the battery has discharged even more to a second and lower threshold level. As shown in the chart above, in the off state, power is discontinued to all of the components shown in the chart. To switch the patient support apparatus 20 out of the off mode, in at least one embodiment, an A/C cable coupled to the patient support apparatus 20 must be plugged back into an A/C power outlet.

Second circuit 66 and wake circuit 76 include no microcontroller, microprocessor, or any other electrical component that executes written instructions (e.g. software or firmware). Instead, second circuit 66 and wake circuit 76 are purely hardware circuits. In at least one embodiment, wake circuit 76 includes one or more transistors (e.g. MOSFETs) that are switched on by the voltage supplied on line 90 when resistive sensing layer 40 detects a user pressing on control surface 46. The outputs of the one or more transistors are coupled to the main power supply and allow power to be supplied to the rest of patient support apparatus 20, including controller 60, when the one or more transistors are turned on. The waking up of control system 52 (transitioning from the sleep mode to the wake mode) therefore takes place purely in hardware, and does not require the use of a microcontroller, microprocessor, or other instruction executing component. This reduces the power consumed by control system 52 when in the sleep mode. Further, as noted above, because first sensing layer 40 acts essentially as an open switch when no user is pressing against control surface 46, first sensing layer 40 consumes substantially no electrical current when in the sleep mode. This further reduces the electrical power consumption of control system 52 when in the sleep mode. Control system 52 is thereby able to switch into a sleep state that consumes very little electrical power and awaken itself from that sleep mode, all while greatly conserving the electrical power of the battery.

In at least one embodiment, wake circuit 76 is merely a logical OR gate whose output is coupled to one or more transistors (e.g. MOSFETS) that, when activated, turn on power to the rest of patient support apparatus 20, including controller 60.

Figure 6:
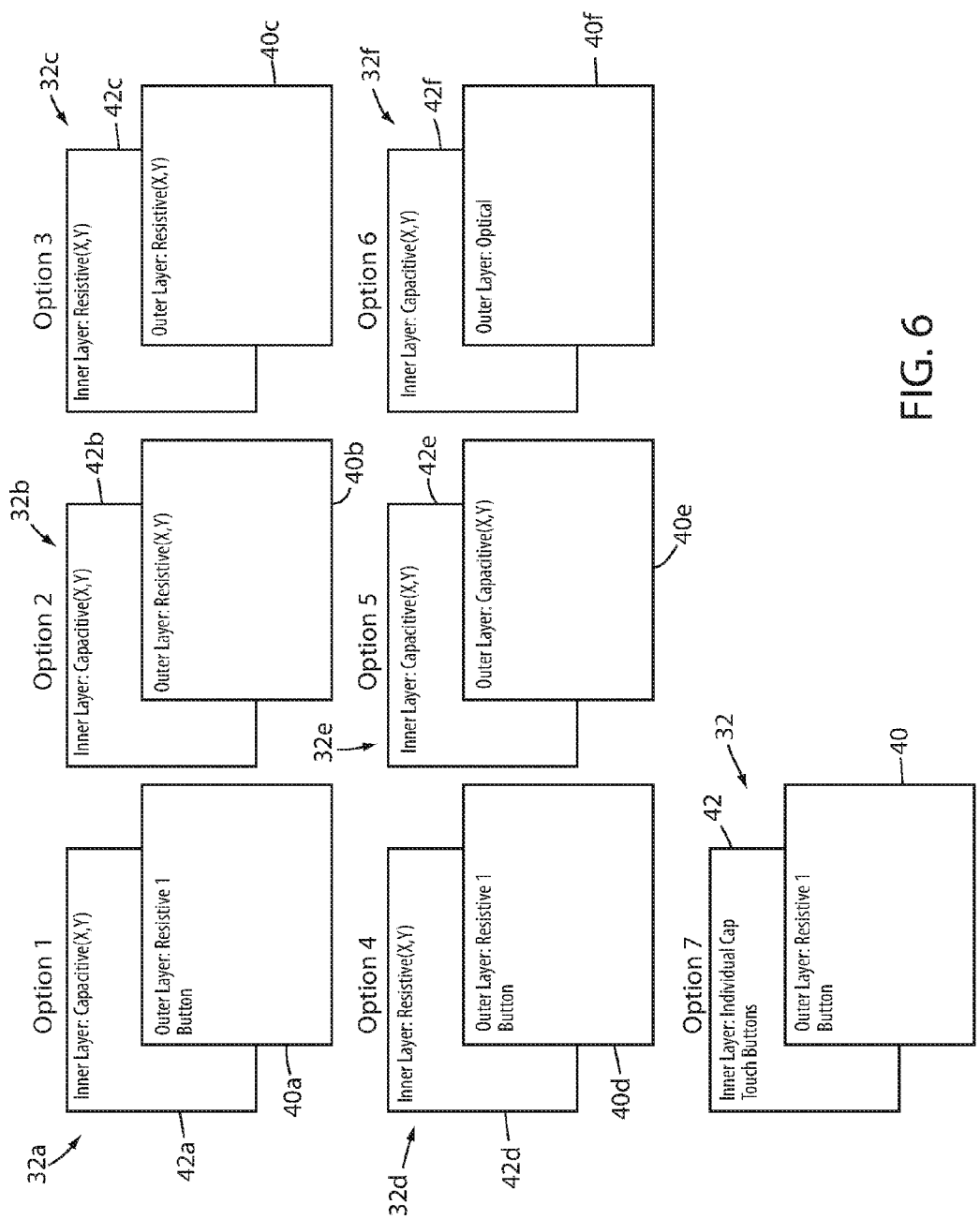
FIG. 6 is a diagram of a plurality of alternative physical constructions for the touch screen control panel of FIG. 2.

The physical construction of control panel 32 can take on a wide variety of different forms from that shown in FIG. 4 and described above. Several of these alternative constructions are illustrated in FIG. 6. More specifically, FIG. 6 illustrates seven different embodiments of control panel 32 that are labeled as options 1 through 7. Each of these different optional constructions of control panel 32 can be utilized with control system 52, or an appropriate modification of control system 52.

Option 1 illustrates a control panel 32a having a first (outer) layer 40a that is placed on top of a second (inner) layer 42a. First layer 40a is the same as first layer 40 described above and shown in FIG. 4. That is, first layer 40a is configured to detect a user pressing anywhere on control surface 46, but is unable to determine a specific location (e.g. X,Y location) of where the user has pressed on control surface 46. Second layer 42a is similar to first layer 40 described above, but has been modified so as to be able to detect the specific location (e.g. X,Y location) at which a user presses against control surface 46. In at least one embodiment, second layer 42a is constructed as a conventional projected capacitive sensing touch screen and includes the following sublayers stacked on top of each other, starting from the bottom and moving upward: a base substrate (which can be an Liquid Crystal Display (LCD), either wholly or partially), a lower patterned ITO or ATO (Antimony Tin Oxide) sublayer, one or more insulating sublayers, an upper patterned ITO or ATO sublayer, and a top glass or film sublayer. One of the patterned ITO or ATO sublayers is arranged in rows and the other is arranged in columns, and by measuring the capacitance at intersections of the various rows and columns, the X,Y location of where the use touched control surface 46 is obtained. In at least one embodiment, the top glass or film sublayer of the capacitive sensing layer 42a is the same as the lower sublayer of the resistive sensing layer 40a. In other embodiments, resistive sensing layer 40a may include a lower sublayer that is separate from the upper sublayer of capacitive sensing layer 42a.

A second option for constructing a control panel is shown in FIG. 6 and labeled as control panel 32b. Control panel 32b includes a first sensing layer 40b that differs from both layers 40 and 40a in that it is adapted to detect where on control surface 46 a user has pressed. That is, control panel 32b uses a resistive sensing layer 40b that detects the X,Y location of the user's contact with control surface 46. In at least one embodiment, resistive sensing layer 40b is implemented in the same manner as a conventional resistive touch screen. For example, in at least one embodiment, resistive sensing layer 40b is constructed as a 4-wire analog resistive touch screen that has the following sublayers stacked on top of each other, starting from the bottom and moving upward: a bottom substrate with a conductive coating applied to its top surface (such as Indium Tin Oxide (ITO)), a layer of flexible insulated dots spaced apart from each other, and a flexible top layer having a conductive coating (e.g. ITO) applied to its bottom surface. The lower ITO layer has an electrode coupled to each end and is used for determining the Y position (in an arbitrary X,Y coordinate frame of reference) of the users touch on control surface 46. The upper ITO layer has electrodes applied to each side and is used to determine the X position of the user's touch on control surface 46. The electrodes of the upper and lower ITO layers are positioned such that an imaginary line drawn between the electrodes of the upper ITO layer will be perpendicular to an imaginary line drawn between the electrodes of the lower ITO layer.

When control system 52 is coupled to control panel 32b, control system 52 may be modified to compares the X,Y locations generated from sensing layers 40b and 42b before taking any action associated with the button(s) 34 defined on control surface 46 (e.g. activating a motor to move a component of patient support apparatus 20). That is, control system 52 may first compare the X,Y location generated from first sensing layer 40b and compare it to the X,Y location generated from second sensing layer 42b. If the two locations are within a threshold distance of each other, or are both located within a predefined location, only then will control system 52 take the appropriate action. If the two X,Y locations are spaced apart more than the threshold, or either one of them is outside of the predefined location, control system 52 will not take the action associated with the button 34.

A third option for constructing a control panel is shown in FIG. 6 and labeled as control panel 32c. Control panel 32c includes first and second layers 40c and 42c that are both constructed in the same manner. More specifically, control panel 32c includes a first sensing layer 40c that is constructed in the same manner as first sensing layer 40b described above (a resistive sensing layer that is able to detect X,Y location). Second sensing layer 42c is likewise constructed in this same manner. Control panel 32c therefore includes two resistive sensing layers 40c and 42c that are both able to detect the X,Y location at which a user pressed on control surface 46. As with control panel 32b, control system 52 may be modified to compare the locations detected by each of the layers 40c and 42c before proceeding to take an appropriate action.

A fourth option for constructing a control panel is shown in FIG. 6 and labeled as control panel 32d. Control panel 32d includes a first resistive layer 40d that is constructed in the same manner as first resistive layer 40a of control panel 32a. Control panel 32d also includes a second layer 42d that is constructed in the same manner as layer 42c of control panel 32c (as well as layers 40c and 40b, which are constructed in the same manner).

The fifth option shown in FIG. 6 is for a control panel 32e having a first layer 40e and a second layer 42e that are both constructed in the same manner as second layers 42a and 42b. The sixth option shown in FIG. 6 is for a control panel 32f having a first layer 40f that incorporates optical touch screen technology and a second layer 42f that is the same as second layers 42a and 42b. In at least one embodiment, the optical touch screen incorporated into first layer 40f is constructed as a conventional infrared grid that uses an array of X,Y infrared LEDs and photodetector pairs positioned around the edges of layer 40f that detect disruptions in the pattern of the LED beams.

The seventh option shown in FIG. 6 illustrates the control panel 32 discussed previously with respect to FIGS. 2-5. That is, first layer 40 is a resistive layer that detects a users touch, but does not detect where the touch occurs, and second layer 42 is comprised of a plurality of individual capacitive buttons that each sense whether the user is touching them, but do not detect what location within the areas defined by the buttons the user has touched.

Any of the different control panel options shown in FIG. 6 can be combined with control systems that include any one or more of the features of control system 52 discussed above. That is, for example, the different modes of control system 52 and the triggers for changing between these modes can be applied to any of the control panel options of FIG. 6, including the turning on and off of electrical power to selected components of the control system for different modes. Alternatively, one or more of the control panels shown in FIG. 6 can be used with control system having features that are different from those of control system 52.

Figure 7:
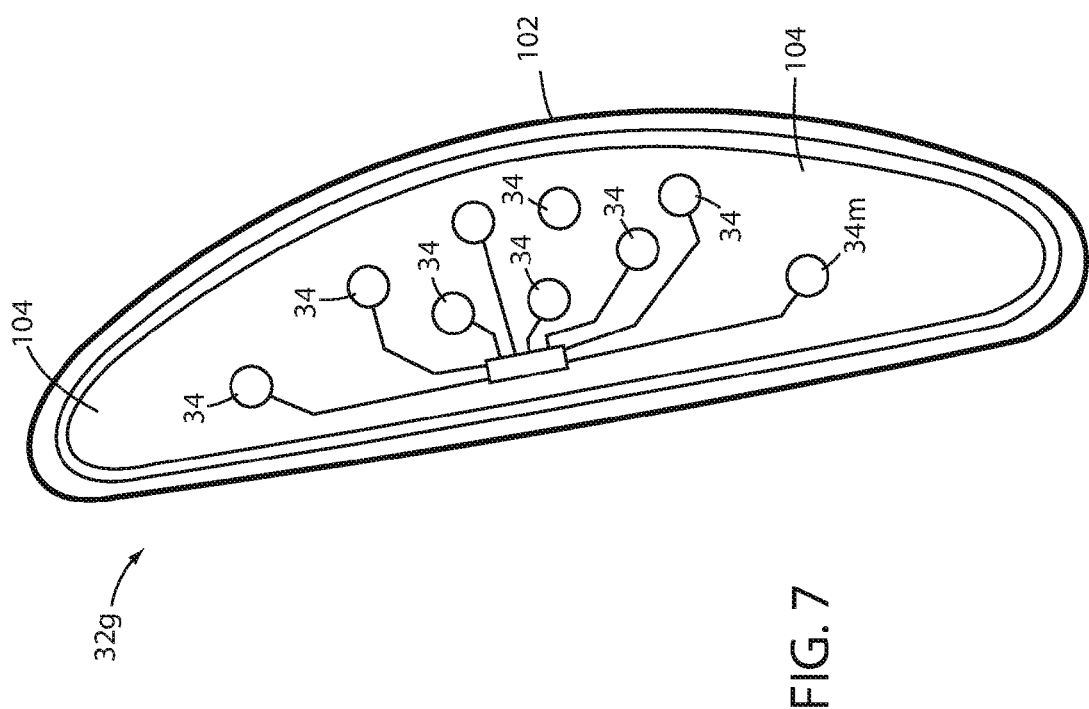
FIG. 7 is a diagram of yet another alternative physical construction for the touch screen control panel of FIG. 2.

FIG. 7 illustrates yet another alternative embodiment of a control panel 32g. Control panel 32g, unlike control panels 32-32f, is comprised of a single sensing layer (with multiple sublayers), rather than the multiple sensing layers of panels 32-32f. More specifically, control panel 32g includes a capacitive sensing layer 102 having a capacitive proximity ring 104 and a plurality of capacitive buttons 34. Capacitive proximity ring 104 extends generally around the perimeter of sensing layer 102. When a voltage is applied to capacitive proximity ring 104, the capacitance that is measurable by capacitive proximity ring 104 is changed when a user's hand and/or fingers move within close proximity to sensing layer 102. Capacitive proximity ring 104 does not detect an X,Y location where the users hand and/or fingers are located, but instead generates a detection signal anytime the users hand and/or fingers are within a threshold distance of sensing layer 102. In some embodiments, the threshold distance is on the order of one or more centimeters, although other thresholds can be used.

Capacitive buttons 34 operate in the same manner as was previously described. The control system to which control panel 32g is coupled is adapted to check the outputs from both capacitive proximity ring 104 and buttons 34 before proceeding to take an action corresponding to one of the buttons 34. For example, if a button 34m is adapted to raise a height of seat 22, the control system will only raise the height of seat 22 if the control system determines that capacitive button 34m was pressed and that capacitive proximity ring 104 has sensed a change in capacitance of a magnitude that is consistent with a user's hand and/or fingers. If only a single one of these are sensed, the control system will not raise the height of seat 22.

In at least one embodiment, the control system is modified to start and/or reset a time whenever capacitive proximity ring detects a change in capacitance having a magnitude that is consistent with a users hand and/or fingers. Once that timer reaches a threshold amount of time, any detections by capacitive buttons 34 of a button press will not be acted upon unless they are also accompanied by a simultaneous change in the capacitance detected by ring 104. In other words, changes in capacitance detected by ring 104 only enable buttons 34 for a threshold amount of time after ring 104 first detects the change. After the threshold amount of time passes, one or more additional changes must be detected by ring 104 before buttons 34 can be activated. By including this feature in at least one embodiment of control panel 32g, control signals that might be due to liquids or other unintended items physically located on control panel 32g will not be able to control patient support apparatus 20 for longer than the threshold amount of time. Thus, for example, if a liquid is initially spilled on control panel 32g, and the spilling of the liquid initially triggers ring 104 and at least one particular button 34, the subsequent lack of any significant changes in capacitance by ring 104 will eventually (after the threshold time period expired) cause control system 52 to stop carrying out the function of that particular button.

Figure 8:
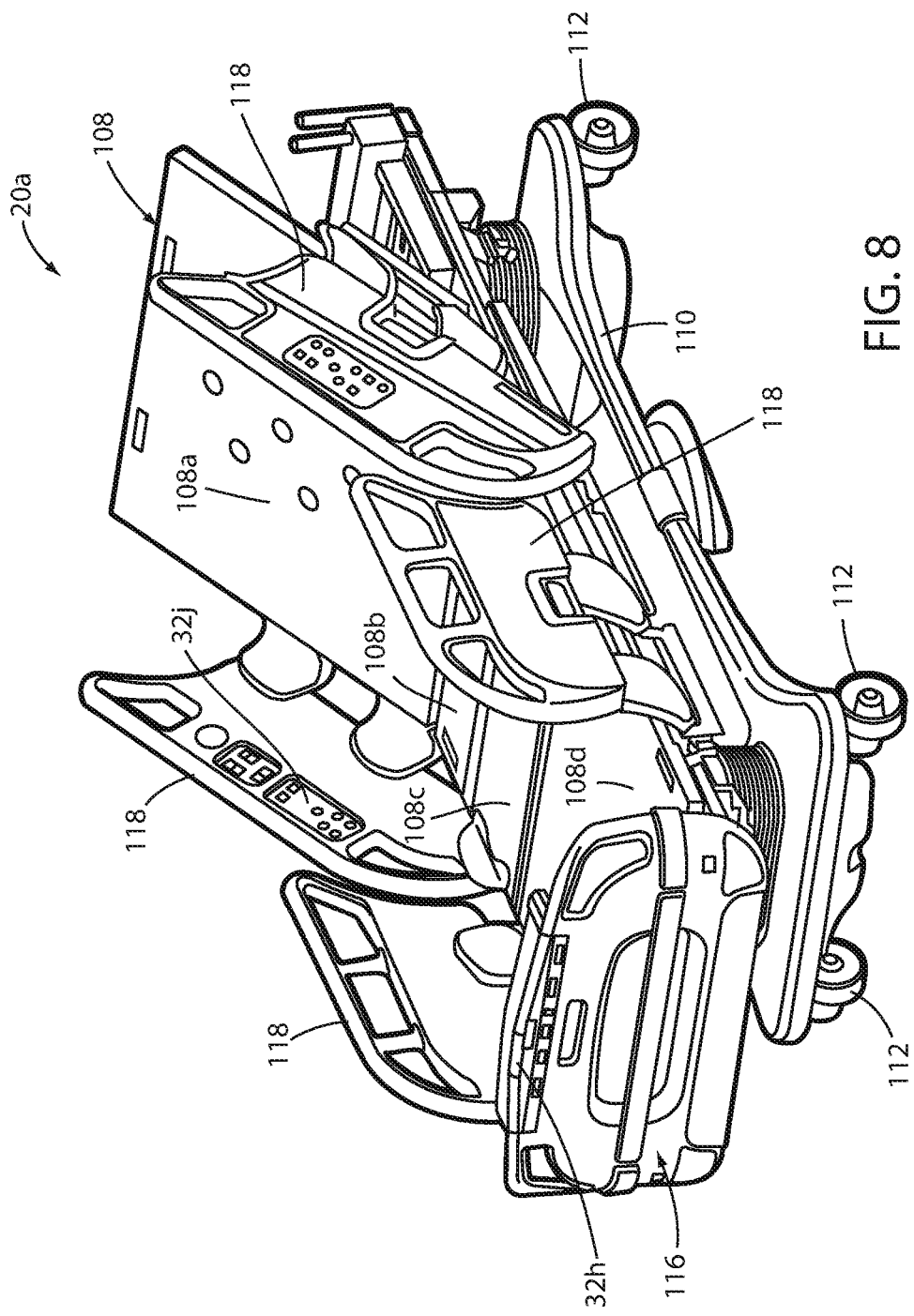
FIG. 8 is a perspective view of an alternative patient support apparatus that incorporates a touch screen control panel, such as, but not limited to, one of those shown in any of FIGS. 1-7 and 9-12.

FIG. 8 illustrates another example of a patient support apparatus 20a that may incorporate any one or more of the control panels 32a-g discussed above. Patient support apparatus 20a is specifically a bed having a support surface 108 on which a mattress may be positioned to allow a person to lie or sit thereon. In the embodiment shown in FIG. 8, support surface 108 is comprised of four separate sections: a head section 108a, a seat section 108b, a thigh section 108c, and a foot section 108d. Head section 108a is pivotable about a generally horizontal axis defined adjacent the intersection of head section 108a and seat section 108b. Foot and thigh sections 108d and 108c may also be pivotable about one or more separate generally horizontal pivot axes. Patient support apparatus 20 further includes a base 110 having a plurality of wheels 112 that allow patient support apparatus 20a to be moved to different locations. Patient support apparatus 20a also includes a footboard 116 and a plurality of siderails 118.

The construction of patient support apparatus 20a may take on a wide variety of different forms. In some embodiments, other than the components described below, patient support apparatus 20a is constructed in any of the manners described in commonly assigned, U.S. Pat. No. 8,689,376 issued Apr. 8, 2014 by inventors David Becker et al. and entitled PATIENT HANDLING DEVICE INCLUDING LOCAL STATUS INDICATION, ONE-TOUCH FOWLER ANGEL ADJUSTMENT, AND POWER-ON ALARM CONFIGURATION, the complete disclosure of which is hereby incorporated herein by reference. In other embodiments, those components of patient support apparatus 20a not described below are constructed in any of the manners described in commonly assigned, U.S. patent application Ser. No. 13/775,285 filed Feb. 25, 2013 by inventors Guy Lemire et al. and entitled HOSPITAL BED, the complete disclosure of which is also hereby incorporated herein by reference. In still other embodiments, patient support apparatus 20 takes on other constructions.

As can be seen in FIG. 8, patient support apparatus 20a includes a control panel 32h positioned on footboard 116, a caregiver control panel 32i positioned on the outside face of the head end siderails 118, and a patient control panel 32j positioned on the inside face of the head end siderails 118. In some embodiments, any one or more of control panels 32h, i, and j are constructed in any of the manners described previously for control panels 32-32f, and include any one or more of the features of the control systems described above. In still other embodiments, any one or more of control panels 32i, j, and/or k are constructed in the manners described below with respect to FIGS. 9 and 10.

Figure 9:
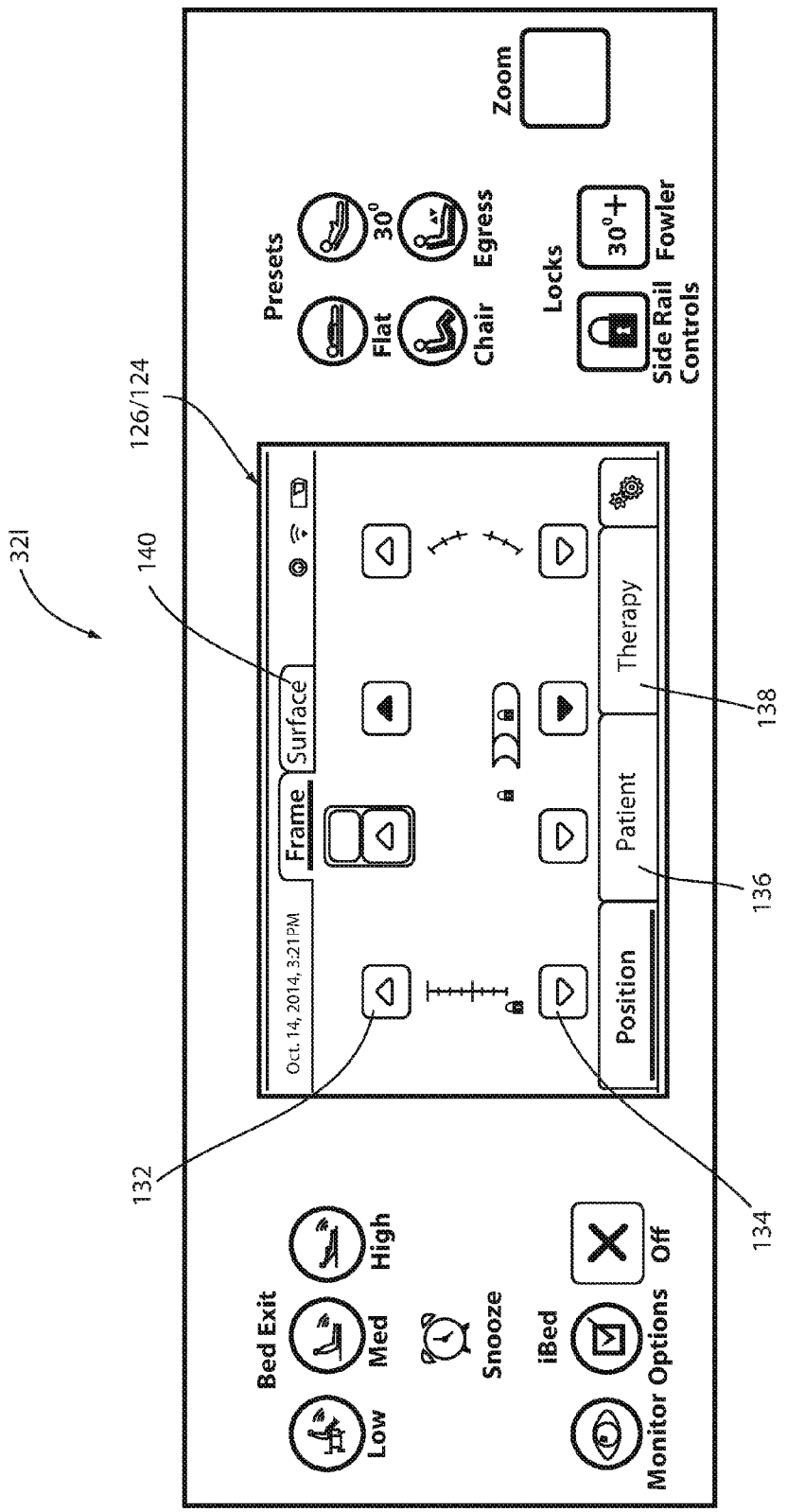
FIG. 9 is a plan view of a touch screen control panel according to another embodiment of the present disclosure.
Figure 10:
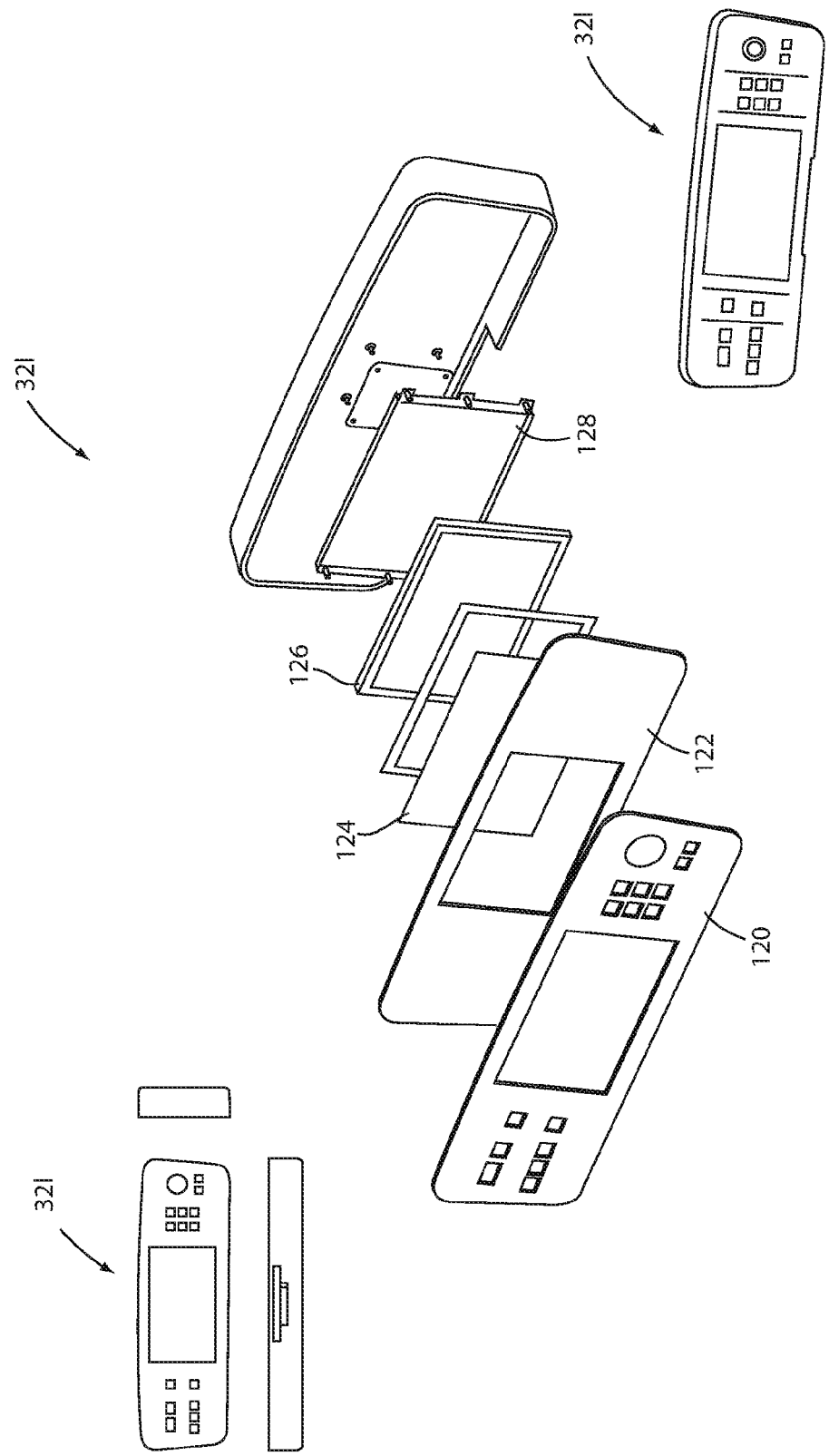
FIG. 10 is a perspective, exploded view of the touch screen control panel of FIG. 9.

FIGS. 9 and 10 illustrate yet another alternative construction for a control panel 32l. As shown more clearly in FIG. 10, control panel 32l includes a membrane key layer 120, a front cover 122, a capacitive touch screen 124, a Liquid Crystal Display (LCD) 126, a display substrate 128, and a rear cover 130. Membrane key layer 120 includes a plurality of membrane keys 121 that are not sensed by capacitive touch screen 124, but instead are comprised of individual capacitive pads, or other individual sensors. A plurality of LEDs 142 (FIG. 12) are mounted behind touch keys 121 and provide selective backlighting to keys 121. In at least one embodiment, LEDs 142 are illuminated at a low intensity and individuals ones of them have their intensity increased when a corresponding membrane key 121 touched by a user. This provides optical feedback to the user that his or her touching of a membrane key 121 was sensed by the control panel. In alternative embodiments, sound and/or haptic feedback is provided to the user when control panel 32l senses the user touching keys 121.

Figure 11:
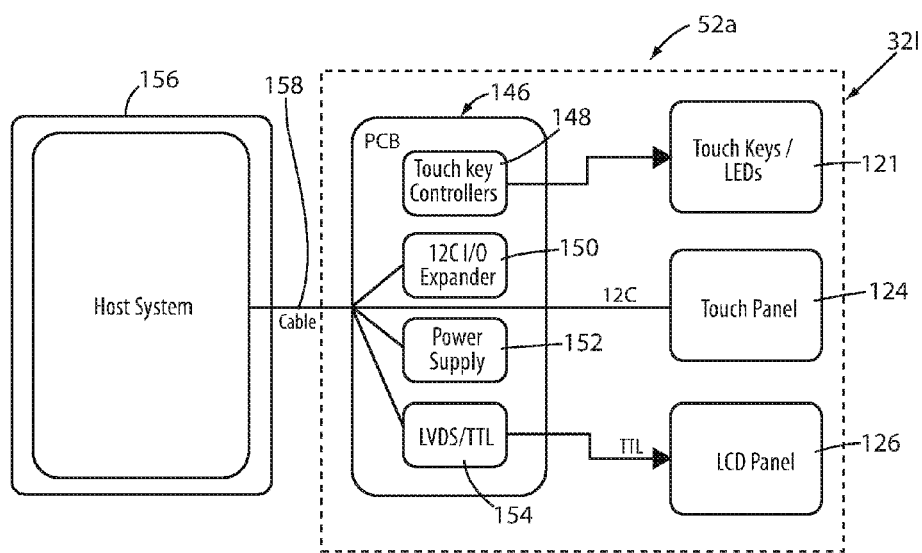
FIG. 11 is a block diagram of a first control system incorporating the touch screen control panel of FIG. 9.

Capacitive touch screen 124 is dimensioned substantially the same as LCD 126 and fits over LCD 126. Capacitive touch screen 124 is, in at least one embodiment, a projected capacitance touch screen that includes only a capacitive sensing layer (i.e. no resistive layer, or other layers, as with, for example, control panel 32). Capacitive touch screen 124 includes the ability to sense the X,Y location of a user's touch. A control system, such as control system 52a shown in FIG. 11, compares the detected X,Y location to the current image being displayed on LCD 126 and takes appropriate action.

For example, as shown in FIG. 9, the image being displayed by LCD 126 includes an up arrow icon 132 and a down arrow icon 134. If a user presses on touch screen 124 at an X,Y location that matches the location of up arrow 132, control system 52 raises the height of support surface 108. Conversely, if the user presses on touch screen 124 at an X,Y location that matches the location of down arrow 132, control system 52a lowers the height of support surface 108. It can also be seen in FIG. 9 that there are other icons that can be selected by the user, including, but not limited to, a patient menu 136, a therapy menu 138, and a surface menu 140. Selecting any of these menus will change the image and icons displayed on LCD 126, as well as the actions undertaken by the control system when a user presses on a particular location of touch screen 124.

In at least one embodiment, touch screen 124 is a projected capacitive touch screen that is adapted to be usable by a user who is wearing gloves, as well as to continue to be usable despite the presence of liquid on the touch screen 124. For example, in at least one embodiment, touch screen 124 is constructed from a Single-Layer Independent Multitouch (SLIM®) sensor structure marketed by Cypress Semiconductor Corp. of San Jose, Calif., and utilizes one of the TrueTouch CYTT21X/31X family of capacitive touch screen controllers that is also marketed by Cypress Semiconductor Corp. When so constructed, touch screen 124 executes both self-capacitance and mutual capacitance measurements in the same device and allows water rejection and wet finger tracking, as well as detection of gloved fingers with glove thicknesses up to 5 millimeters. In other embodiments, touch screen 124 utilizes any of the fifth generation family, or higher generations, of touchscreens and/or touch controllers from Cypress Semiconductor (e.g. CYTK450 TrueTouch® touch screen and CYTMA5xx System on a Chip)

In at least one other embodiment, touch screen 124 is a projected capacitance touch screen that is constructed using a duraTOUCH® touchscreen marketed by UICO, LLC of Elmhurst, Ill., that includes both UICO's waterSENSE® and gloveSENSE® technologies. In still other embodiments, touch screen 124 is manufactured to utilize any one or more of the technologies disclosed in U.S. Pat. No. 8,866,793 issued to Wadia and entitled CAPACITIVE TOUCH SCREEN HAVING DYNAMIC CAPACITANCE CONTROL AND IMPROVED TOUCH-SENSING; U.S. Pat. No. 8,493,356 issued to Joharapurkar et al. and entitled NOISE CANCELLATION TECHNIQUE FOR CAPACITIVE TOUCHSCREEN CONTROLLER USING DIFFERENTIAL SENSING; U.S. patent publication 2010/0117985 filed by Wadia and entitled CAPACITIVE TOUCH SCREEN AND STRATEGIC GEOMETRY ISOLATION PATTERNING METHOD FOR MAKING TOUCH SCREENS; and/or U.S. patent publication 2014/0022498 filed by Wadia and entitled CAPACITIVE TOUCH SCREEN HAVING DYNAMIC CAPACITANCE CONTROL AND IMPROVED TOUCH SENSING, the complete disclosures of all of which are hereby incorporated herein by reference.

FIG. 11 illustrates in more detail control system 52a, which may be used to control control panel 32l. As shown therein, control system 52a includes a printed circuit board 146 on which is mounted a plurality of electronics in communication with the keys 121, capacitive touch screen 124, and LCD 126. These electronics include a touch key controller 148, an I$^2$C input/output (I/O) expander 150, a power supply 152, and a Low Voltage Differential Signaling (LVDS) and Transistor-Transistor Logic (TTL) module 154. The components on circuit board 146 communicate with a host system 156 via a cable 158. The host system 156, in many of the embodiments discussed herein, is a patient support apparatus 20. In at least some embodiments, however, the host device is a thermal control unit, such as that disclosed in commonly assigned U.S. patent application Ser. No. 14/282,383 filed May 20, 2014 by inventors Christopher J. Hopper et al. and entitled THERMAL CONTROL SYSTEM, the complete disclosure of which is hereby incorporated herein by reference.

Figure 12:
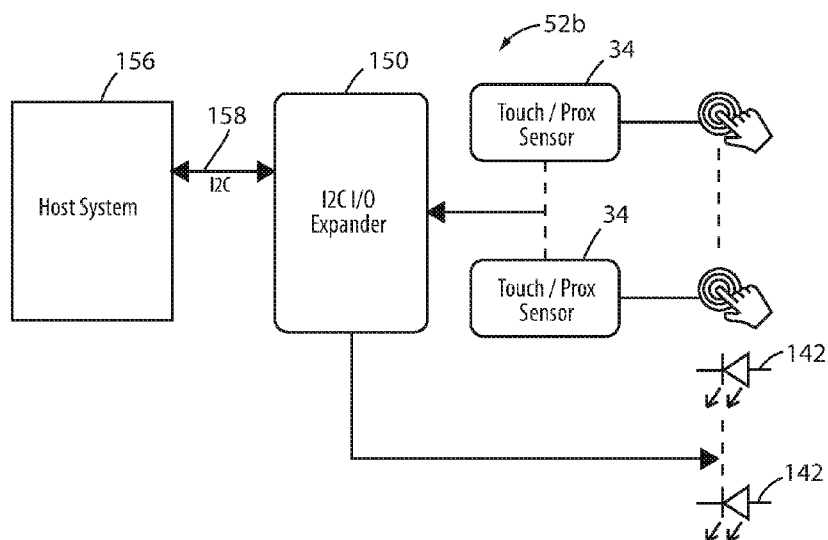
FIG. 12 is a block diagram of a second control system incorporating the touch screen control panel of FIG. 9.

FIG. 12 illustrates an alternative control system 52b that may be used to control yet another type of control panel. More specifically, control system 52b is adapted to be used with a control panel having a plurality of individual capacitive buttons 34, rather than a capacitive or resistive touch screen. The control panel includes a plurality of LEDS 142 that are selectively activated based upon which button 34 is pressed. As noted above, in some embodiments, LEDs 142 are activated at a low intensity between touches and switched to a high intensity while touched in order to provide the user with visual feedback of the user's touch. The touching of buttons 34 and activation of LEDs 142 are communicated via an I$^2$C protocol to expander 150 which, in turn, communicates via the I$^2$C protocol with the host system 156.

Figure 13:
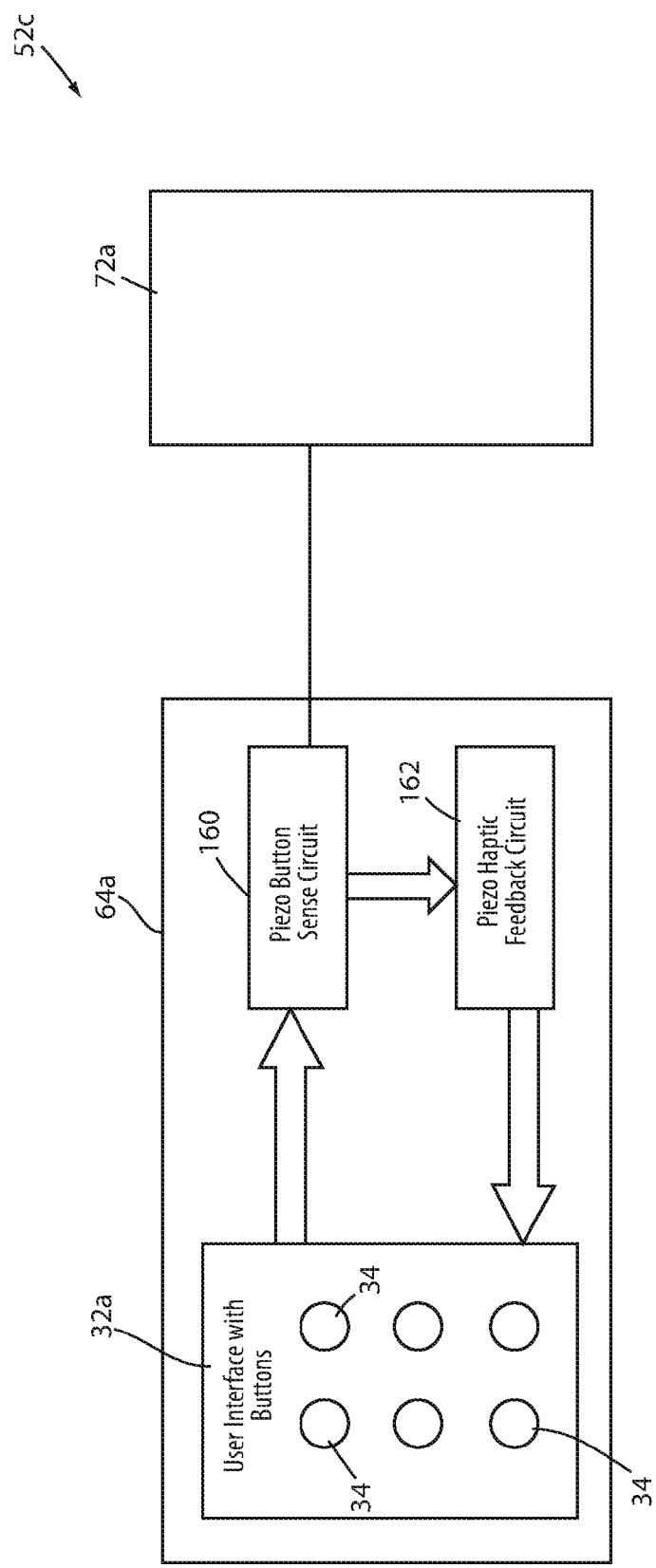
FIG. 13 is a block diagram of yet another alternative control system that may be incorporated into any of the patient support apparatuses disclosed herein.

FIG. 13 illustrates yet another alternative control system 52c that may be used with any of the patient support apparatuses disclosed herein, including, but not limited to, those shown in FIGS. 1 and 8. Control system 52c includes a modified control panel 32a that is mounted to a circuit board 64a. Control panel 32a is different from control panel 32 in that its buttons 34 include piezoelectric devices that are adapted to generate an electrical voltage when they are touched. In other words, they are adapted to create voltages due to mechanical pressure. These voltages are sensed by a sensing circuit 160. Sensing circuit 160 is in communication with a main PCB 72a, which may include any one or more of the components of PCB 72 (e.g. a main controller 60, H-bridge 80, etc.). Sensing circuit 160 communicates to PCB 72 the particular buttons 34 that are pressed, as determined by the piezoelectric devices.

Control system 52c also includes a piezo-haptic feedback circuit 162 that is in communication with sensing circuit 160. Piezo-haptic feedback circuit 162 creates haptic feedback to a user of control panel 32a by applying a voltage to the piezoelectric devices that have been touched, thereby causing the piezoelectric devices to vibrate. The vibration is sufficient for a user to feel when he or she touches buttons 34. This gives the user feedback that his or her touching of the buttons 34 was sensed by control panel 32a. In one embodiment, a separate piezoelectric device is included for each button 34, and each of the piezoelectric devices functions both to sense a user's touch and to deliver haptic feedback to the user.

Using piezoelectric devices with control panel 32a allows a user interface to be created on virtually any surface. The surface does not have to be glass or plastic like many displays and/or user interfaces utilize. The piezoelectric devices can be placed behind a variety of materials including plastic, metal, wood, glass, etc. The devices can also be placed behind already existing structures and use the deflection of that structure to activate the device. This allows the use of flat, dimpled, convex, and/or concave surfaces with control panel 32a. This, in turn, allows the outer surface of control panel 32a to be a seamless interface that can be completely sealed, thereby preventing infectious fluids from entering control panel 32 and allowing disinfecting liquids to be applied to the surface of control panel 32a.

Various additional alterations and changes beyond those already mentioned herein can be made to the above-described embodiments. This disclosure is presented for illustrative purposes and should not be interpreted as an exhaustive description of all embodiments or to limit the scope of the claims to the specific elements illustrated or described in connection with these embodiments. For example, and without limitation, any individual element(s) of the described embodiments may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Any reference to claim elements in the singular, for example, using the articles "a," "an," "the" or "said," is not to be construed as limiting the element to the singular.

What is claimed is:

1. A patient support apparatus comprising:
  a support surface adapted to support a patient thereon, the support surface including a plurality of sections;
  an actuator adapted to move a section of the support surface in a first direction and a second direction;
  a control surface having a first area;
  an actuator button defined on the control surface, the actuator button occupying a second area smaller than the first area;
  a first sensing layer adapted to detect if a user touches the control surface in the first area, the first sensing layer being a resistive sensing layer adapted to detect changes in electrical resistance when the user touches the control surface in the first area;
  a second sensing layer adapted to detect if the user touches the control surface in the second area, the second sensing layer being a capacitive sensing layer adapted to detect changes in electrical capacitance when the user touches the control surface in the second area; and
  a control system for controlling the actuator, the control system in communication with the first and second sensing layers, the control system adapted to actuate the actuator to move the section in the first direction if both the first sensing layer detects the user touching the control surface in the first area and the second sensing layer detects the user touching the control surface in the second area, the control system adapted to not actuate the actuator to move the section in the first direction if the first sensing layer does not detect the user touching the control surface in the first area but the second sensing layer does detect the user touching the control surface in the second area, and the control system adapted to not actuate the actuator to move the section in the first direction in the absence of both the first sensing layer detecting the user touching the control surface in the first area and the second sensing layer detecting the user touching the control surface in the second area.

2. The patient support apparatus of claim 1 wherein the second area is defined entirely within the first area.

3. The patient support apparatus of claim 1 further comprising a second actuator button defined on the control surface, the second actuator button occupying a third area separate from the second area and smaller than the first area, wherein the control system is further adapted to actuate the actuator to move the section in the second direction if both the first sensing layer detects the user touching the control surface in the first area and the second sensing layer detects the user touching the control surface in the third area.

4. The patient support apparatus of claim 3 wherein the control system is adapted to not actuate the actuator to move the section in the second direction if either the first sensing layer does not detect the user touching the control surface in the first area or the second sensing layer does not detect the user touching the control surface in the third area.

5. The patient support apparatus of claim 1 further comprising an illumination layer positioned adjacent one of the first and second sensing layers, the illumination layer comprising a light source adapted to provide backlighting to the actuator button.

6. The patient support apparatus of claim 5 wherein the control system activates both the first and second sensing layers at all times when the light source is activated.

7. The patient support apparatus of claim 5 wherein the control system activates only the first sensing layer if the light source is not activated.

8. The patient support apparatus of claim 7 wherein, if the light source is not activated, the control system activates the light source and the second sensing layer upon detecting, via the first sensing layer, that the user has touched the control surface in the first area.

9. The patient support apparatus of claim 1 wherein the patient support apparatus is one of a recliner, bed, stretcher, and cot.

10. The patient support apparatus of claim 1 further comprising a haptic device positioned adjacent the second sensing layer and the actuator button, wherein the control system is adapted to vibrate the haptic device when the user touches the control surface in the second area.

11. The patient support apparatus of claim 1 wherein the section of the support surface is a seat and the first direction is up and the second direction is down.

12. A patient support apparatus comprising: a support surface adapted to support a patient thereon;
a user interface having a control surface, a first layer, a second layer, and a button occupying a first area of the control surface, the button associated with a function of the patient support apparatus, the first sensing layer being a resistive sensing layer adapted to detect if the user touches the button by detecting changes in electrical resistance, and the second sensing layer being a capacitive sensing layer adapted to detect if the user touches the button by detecting changes in electrical capacitance; and
a control system adapted to operate in a wake mode and a sleep mode, the control system activating both the first and second sensing layers at all times while in the wake mode, and the control system activating only the first sensing layer while in the sleep mode, wherein the control system carries out the function if the first and second sensing layers detect the user touching the button while the control system is in the wake mode, does not carry out the function if only one of the first and second sensing layers detects the user touching the button while the control system is in the wake mode, does not carry out the function if both the first and second sensing layers do not detect the user touching the button while the control system is in the wake mode, and activates the second sensing layer if the first sensing layer detects the user touching the button while in the sleep mode.

13. The patient support apparatus of claim 12 further comprising an illumination layer positioned adjacent one of the first and second sensing layers, the illumination layer comprising a light source adapted to provide backlighting to the button; and wherein the control system deactivates the light source after a threshold amount of time passes while the control system is in the wake mode, and the control system deactivates the light source at all times while the control system is in the sleep mode.

14. The patient support apparatus of claim 12 wherein the control surface has a second area greater than the first area occupied by the button, and wherein the control system is adapted to switch from the sleep mode to the wake mode if the first sensing layer detects the user touching anywhere on the control surface.

15. The patient support apparatus of claim 14 wherein the function includes controlling an actuator of the patient support apparatus.

16. The patient support apparatus of claim 15 wherein the control system includes a microcontroller in communication with the second sensing layer and adapted to process outputs from the second sensing layer, wherein the control system shuts off electrical power to the microcontroller when the control system is in the sleep mode.

17. The patient support apparatus of claim 14 further comprising an actuator button occupying a third area on the control surface, wherein the third area is distinct from the first area and included within the second area, the actuator button adapted to control a moving component of the patient support apparatus.

18. The patient support apparatus of claim 12 further comprising a haptic device positioned adjacent the second sensing layer and the button, wherein the control system is adapted to vibrate the haptic device when the user touches the button.

* * * * *